Nov. 15, 1927.  1,648,908

H. MERCIER

PNEUMATIC SUSPENSION FED BY COMPRESSED AIR

Filed April 3, 1922

INVENTOR
Henri Mercier
By Chas. J. O'Neill
ATTORNEY

Patented Nov. 15, 1927.

1,648,908

UNITED STATES PATENT OFFICE.

HENRI MERCIER, OF PARIS, FRANCE.

PNEUMATIC SUSPENSION FED BY COMPRESSED AIR.

Application filed April 3, 1922, Serial No. 549,179, and in France April 5, 1921.

This invention deals with pneumatic suspensions equipped with a regulating leak, and has among its objects a reduction in the amount of compresed air required and a saving of the lubricant usually lost in this type of suspension by leakage past stuffing boxes and as a mist carried away by the compressed air. The device, because of its closed circuit arrangement, is not only more efficient than previous installations, but is also less expensive, both in regard to first cost and to continued operation, the use of high pressures resulting in a corresponding decrease in volume. The elimination of oil leakage loss also increases the cleanliness of the installation as a whole.

The main features of the invention are as follows:

1. The use of a return system whereby the compressed air with its entrained oil is returned to a closed reservoir which in turn supplies the compressor, thus providing for a minimum use of additional air.

2. The use of a suction system for maintaining a decreased pressure in the lubrication areas and the stuffing boxes, so that oil leakage is collected and subsequently returned to the system by the compressor.

Other objects and features will be apparent from the following description and the accompanying figures. The invention is not limited to pneumatic suspensions operated by compressed air, but may be applied to any type of apparatus functioning in a similar manner, such as, for example, vehicle brakes.

Figures 3, 4:
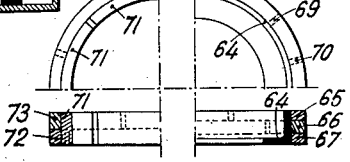
Figures 3 and 4 show stuffing rings particularly well adapted for use in said suspensions.

In these figures, the axle is shown at 1, the movable part of the suspension connected to the axle at 2, the fixed part of said suspension fixed to the chassis is at 3, the packing, preferably, a cup leather as shown in Figures 3 and 4 is indicated at 4, and the compressor 5 which is worked either by the motor of the vehicle or by any other means. The members 2 and 3 communicate with each other through the tube 4ª for the passage of the fluid from one member to another as said members relatively move.

Figure 1:
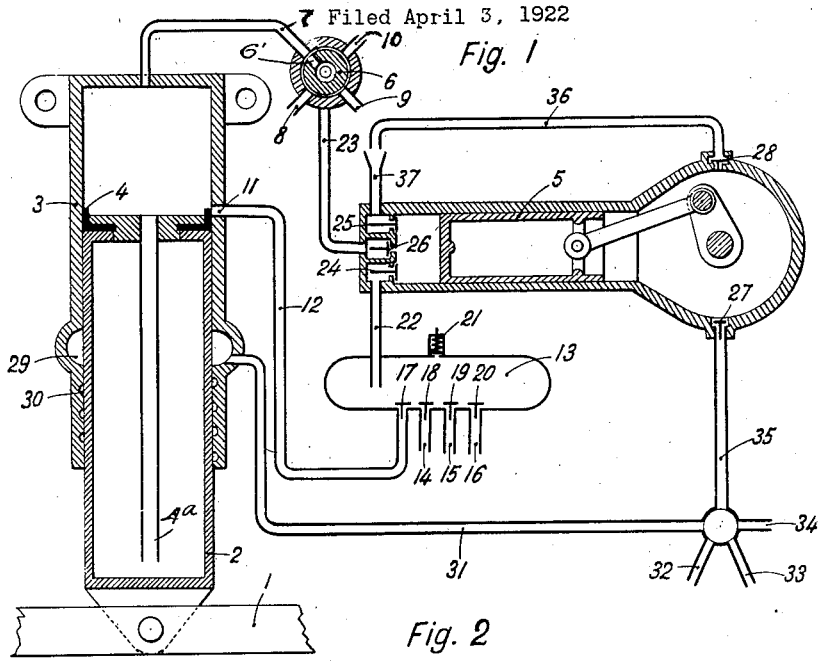
Figure 1 shows an example of the invention applied to pneumatic suspensions fed continuously.

In Figure 1, 6 is a special distributing valve working synchronously with the compressor and at a speed whereby for each stroke of the piston the compressed air may be in turn directed through the port 6' to the four pipes 7, 8, 9 and 10 leading to the four suspension apparatuses of the vehicle, assuming of course that four are provided. The regulating leak is indicated at 11. The compressed air which escapes from said leak, passes through a conduit 12, into a reservoir 13 to which are also connected the pipes 14, 15 and 16 leading from the three other suspensions of the vehicle, not shown. Four valves 17, 18, 19 and 20 are placed on the fittings of the pipes 12, 14, 15 and 16 connected to the reservoir 13. This reservoir carries a valve 21 which opens to the atmosphere, a spring being provided to allow the opening of the valve only when the pressure in the reservoir 13 reaches a certain value. The reservoir 13 is connected to the compressor by a conduit 22 and said compressor is connected to the valve 6 by a delivery pipe 23.

The compressor has two suction valves 24 and 25 and a delivery valve 26 and two crank case valves, a suction valve 27 and a delivery valve 28. The suspension devices are provided with annular grooves such as shown at 29, and are connected with the atmosphere by a helical conduit such as 30, and with the crank case of the compressor by the pipes 31, 32, 33, 34 and 35.

Finally, the oil and air driven from the crank case through the pipe 36 is delivered above the tubing 37 through which atmospheric air is sucked by the compressor.

Figure 2:
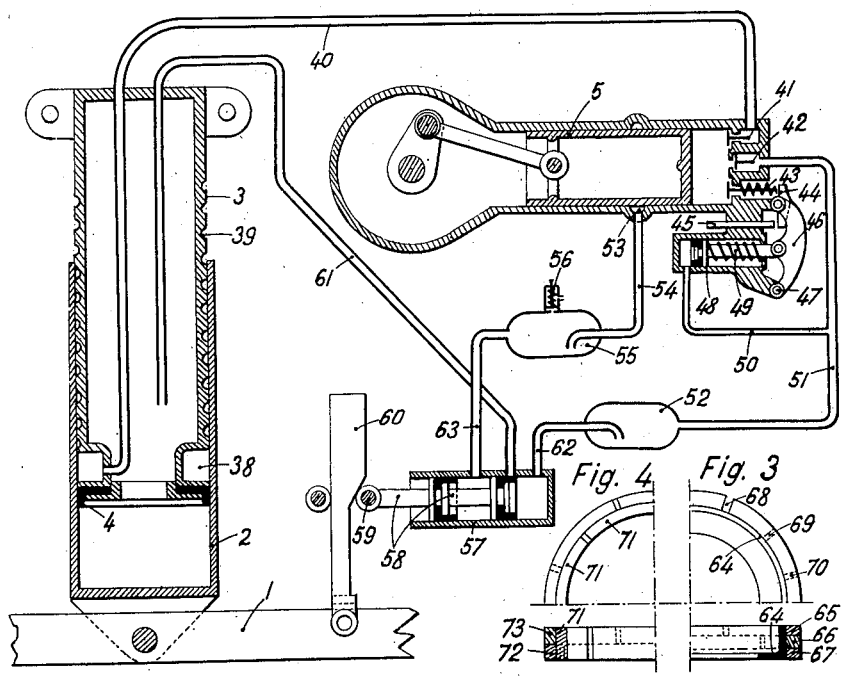
Figure 2 shows a modified construction when the pneumatic suspensions are not fed continuously.

In the modified form shown on Figure 2, only one suspension apparatus has been shown, as in Figure 1, the compressor and reservoirs are the same for all the suspensions of the vehicle. 38 is the annular groove of the member 3 on the down stream side of the packing 4 of the suspension. 39 is the helicoidal groove which connects said groove 38 with the atmosphere, this connection being somewhat restricted. 40 is the suction conduit which connects the groove 38 with the compressor.

The compressor is provided with an automatic suction valve 41, a delivery valve 42 and a suction valve 43 fitted with a spring of sufficient resistance to allow its opening only through the action of a tumbler 44 pushed by a rod 45, which is itself moved by a suitable cam fixed on the shaft of the compressor.

The axis of said tumbler 44 is placed on a lever 46, which can rotate on an axis 47. This lever is acted upon by a piston 48 and a spring 49 which brings it back automatically in the position shewn on the figure. The piston 48, through conduit 50, is under the action of the pressure existing in the delivery conduit 51 of the compressor or of the reservoir 52.

The compressor in addition, is provided with an opening or inlet 53 exposed at the end of the stroke, which is connected by a conduit 54 with a reservoir 55, this latter being provided with a valve 56 through which the reservoir communicates with the atmosphere, said valve having a spring which permits opening only when the pressure in the reservoir 55 reaches a certain value. 57 is the valve or distributor of the device of the suspension, it has the shape of a piston valve, the rod having a terminal roller 59, and being maintained in contact with the cam 60, by compressed air thru pipe 62, which leads from reservoir 52; and said cam 60 is connected either to the axle of the vehicle or to the suspension itself. The number of valves is equal to the number of suspensions on the vehicle.

Each valve is connected with the suspension apparatus by a conduit such as 61 which is used either for admission or exhaust (regulating leak) of the compressed air mixed with oil of the suspension, according to the position of the piston valve 58 which acts in accordance with the requirements of the suspension. This last is connected to the reservoir 52, through conduit 62 for admission, or connected by conduit 63, with reservoir 55, for exhaust.

On Figures 3 and 4 are shown stuffing or packing rings which are particularly effective for use in the suspension apparatus, in which the packing rings must be absolutely tight without increasing the friction.

Figure 3 shows an improved packing which is absolutely tight without undue friction in fact with less friction than the ordinary cup made of leather or any other material. On the figure the cup leather is shown at 64, and is surrounded by a certain number of split segments which can expand such as 65, 66, 67, the slits 68, 69, 70 of these segments being displaced so that they do not register under the pressure of the cup leather, the slits are left somewhat large. The segments 65, 66, 67 rub only on the cylinder.

Figure 4 shows a modified form of the packing ring of Figure 3, the cup leather being replaced by a segment 71, bearing on segments 72—73 which rub against the cylinder. The segments 71, 72 and 73 contain slits which do not register.

With these two packings, Figures 3 and 4, tightness is insured. In addition, the materials from which the segments are made, fiber or metal, have a smaller friction coefficient than the cup leather.

The working of the device shown in Figure 1 is as follows:

The compressor is started and atmospheric air is drawn through short pipe 37 and valve 25, and is delivered through valve 26 and conduit 23 to the distributor 6 which admits the air, in turn, to the four suspension apparatuses through conduits 7, 8, 9 and 10.

The pressure increasing these lift the vehicle, and take the position shown on Figure 1, the pressure in each apparatus corresponding to the load that they have to bear.

From this moment, the compressed air and oil which is supplied to the suspension apparatus leaks through the openings 11 through the pipes 12, 14, 15 and 16 and check valves 17, 18, 19 and 20 into the reservoir 13, the pressure in said reservoir not being able to increase beyond a certain limit on account of the valve 21.

But as the compressor is still running it does not draw any atmospheric air through valve 25, suction taking place preferably through valve 24 connected to the reservoir 13, the check valve 13 opening before check valve 25 on account of the greater pressure existing in said reservoir. It follows that a regular continuous circulation of compressed air mixed with oil, without any expansion except the one due to the loss of head in the conduits, is established, the compressor acting only to move the fluids once the proper pressure is reached. During the time that the compressor is working a continuous suction takes place in the crank-case through the conduits 35, the conduits 31, 32, 33, 34 and grooves 29 of the suspension apparatus, the small quantity of air entering through the grooves carrying with it the oil from the packings into the crank-case of the compressor, where it is used for lubrication, the excess going through conduit 36, to the pipe 37 and then in the chamber of valve 25 from which it is sucked with the first suction of atmospheric air.

The working of the device shown in Figure 2 is as follows:

The compressor is started and first sucks through valve 41, pipe 40 and groove 38, a decrease of pressure being produced in said groove. When the piston has travelled the necessary distance, about one-fifth of its stroke the valve 43 is raised on account of the action of tumbler 44 and rod 45 moved by a cam of the compressor. The piston then sucks atmospheric air, the valve 43, under the action of the tumbler 44 closing before the opening of the inlet 53 by the piston. In coming back the piston pushes the air sucked from reservoir 55, through valve 42, conduit 51, into the suspension apparatus, through conduits 62 and 61, the piston valve 58 of distributor 57 being then in the right position to permit the flow of air. When the pressure has the required value, the suspension works lifting the vehicle, the cam 60 in its motion moving the piston valve 58, and closing the connection between conduit 62 and 61. The pressure now increases in the reservoir 52 up to the point where the compressed air acts on piston 48 through by pass 50, against the action of the spring 49. Lever 46 turns around 47 and pushes back the tumbler 44 of valve 43 and acting rod 45. Valve 43, kept on its seat by its spring, cannot act, and it follows that the compressor ceases to accumulate air in the reservoir 52, the small quantity of air passing through the valve 41 being negligible.

When on account of movement of the suspension the piston valve 58 is moved by the cam 60 which permits connection between conduits 61 and 63, the compressed air of the suspension escapes through 61 and 63 and the pressure in the reservoir 55 increases. If said pressure goes beyond the limit assigned to valve 56, escape takes place into the atmosphere.

But whether valve 56 is open or closed the compressor still runs, air under pressure and not expanded (or hardly expanded) coming from the suspension apparatus into reservoir 55, passing through conduit 54, when the piston in its reciprocating motion uncovers opening 53, and air filling the cylinder or is added to atmospheric air which has already been sucked through 41 and 43, the whole of this gas is then pushed through valve 42 into reservoir 52 from which it is used to supply the suspension apparatus.

The decrease of pressure in the groove 38 or 39 may be obtained by any other means such as an independent pump for example, worked by the motor or the axle or even the suspension itself.

I claim—

1. A pneumatic suspension apparatus for road vehicles comprising a co-operating pressure cylinder and load supporting piston adapted to be operatively connected to the chassis and axle of said vehicle, an air compressor adapted to supply air under pressure to said pressure cylinder, means adapted to return a portion of the air supplied to said pressure cylinder to said air compressor, and a valve in said means positively operated by the linear relation of said piston and said pressure cylinder for controlling the last mentioned means.

2. A pneumatic suspension apparatus for road vehicles, comprising a co-operating pressure cylinder and load supporting piston adapted to be operatively connected to the chassis and axle of said vehicle, a chamber interposed between the cooperating walls of said piston and cylinder, a helical conduit formed between the walls and communicating with said chamber, at one end and the atmosphere at the other, an air compressor having intake and supply ports, means connecting said chamber with the intake of said compressor, and means connecting the supply port of said compressor with the pressure cylinder, substantially as described.

In testimony whereof I affix my signature.

HENRI MERCIER.